(12) United States Patent
Jassowski et al.

(10) Patent No.: US 11,352,133 B2
(45) Date of Patent: *Jun. 7, 2022

(54) SYSTEMS, CABLELESS DRONE SWARM SYSTEMS, METHOD AND APPARATUS

(71) Applicant: Intel Corporation, Santa Clara, CA (US)

(72) Inventors: Michael Jassowski, El Dorado, CA (US); Ashwin Thirunahari, Folsom, CA (US); Anil Nanduri, San Jose, CA (US); Baptiste Tripard, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 445 days.

This patent is subject to a terminal disclaimer.

(21) Appl. No.: 15/856,615

(22) Filed: Dec. 28, 2017

(65) Prior Publication Data

US 2019/0047698 A1    Feb. 14, 2019

(51) Int. Cl.
*B64C 39/02*    (2006.01)
*G05D 1/08*    (2006.01)
*G05D 1/10*    (2006.01)

(52) U.S. Cl.
CPC ......... *B64C 39/024* (2013.01); *G05D 1/0816* (2013.01); *G05D 1/104* (2013.01); *B64C 2201/021* (2013.01); *B64C 2201/024* (2013.01); *B64C 2201/027* (2013.01); *B64C 2201/128* (2013.01)

(58) Field of Classification Search
CPC .... G05D 1/0816; G05D 1/104; G05D 1/0027; B64C 2201/021; B64C 2201/024; B64C 2201/027; B64C 2201/00; B64C 2201/128; B64C 39/024; B64D 3/56; B64D 1/22

See application file for complete search history.

(56) References Cited

U.S. PATENT DOCUMENTS

| | | | |
|---|---|---|---|
| 10,293,936 B1* | 5/2019 | Conn | B64C 39/024 |
| 10,324,462 B2* | 6/2019 | Jassowski | B64D 1/22 |
| 2005/0210327 A1 | 9/2005 | Allue et al. | |
| 2007/0171029 A1 | 7/2007 | Inbarajan | |
| 2013/0238933 A1 | 9/2013 | Shin | |
| 2014/0013157 A1 | 1/2014 | Hopkins | |
| 2016/0146888 A1 | 5/2016 | Vooka et al. | |
| 2016/0225198 A1 | 8/2016 | Punjabi et al. | |
| 2017/0106986 A1* | 4/2017 | Sweeny | B64D 45/00 |
| 2017/0142187 A1 | 5/2017 | Pimentel | |
| 2017/0355460 A1* | 12/2017 | Shannon | B64D 1/12 |
| 2018/0074488 A1* | 3/2018 | Cantrell | B64C 39/024 |
| 2018/0086455 A1* | 3/2018 | Burch, V | G01S 19/49 |
| 2018/0101458 A1 | 4/2018 | Kumar et al. | |

(Continued)

*Primary Examiner* — Valentina Xavier
(74) *Attorney, Agent, or Firm* — Spectrum IP Law Group LLC

(57) ABSTRACT

The disclosure generally provides methods, systems and apparatus for networked drone systems. In an exemplary networked drone system, a plurality of smaller drones are attached to a fixed platform to increase delivery payload, distance, reliability and safety. As a drone nears charge depletion, it is replaced in-flight with a new drone. Thus, the networked drone system need not be grounded to replace the depleted drone. In another embodiment, flight efficiency is increased by providing collapsible wins to the networked drone system.

24 Claims, 16 Drawing Sheets

(56) References Cited

U.S. PATENT DOCUMENTS

| | | | |
|---|---|---|---|
| 2018/0173220 A1* | 6/2018 | Wang | B64C 27/006 |
| 2018/0354619 A1* | 12/2018 | Hefner | B64C 39/024 |
| 2019/0047698 A1 | 2/2019 | Jassowski et al. | |
| 2019/0050279 A1 | 2/2019 | Derr et al. | |
| 2019/0068962 A1* | 2/2019 | Van Schoyck | G01C 21/20 |
| 2019/0118944 A1* | 4/2019 | Kimchi | G08G 5/0091 |
| 2019/0166765 A1* | 6/2019 | Maor | G06F 16/587 |
| 2019/0196512 A1* | 6/2019 | Blake | G06Q 10/06315 |
| 2019/0250969 A1 | 8/2019 | Tan et al. | |
| 2020/0364456 A1* | 11/2020 | Tran | G05B 17/02 |

* cited by examiner

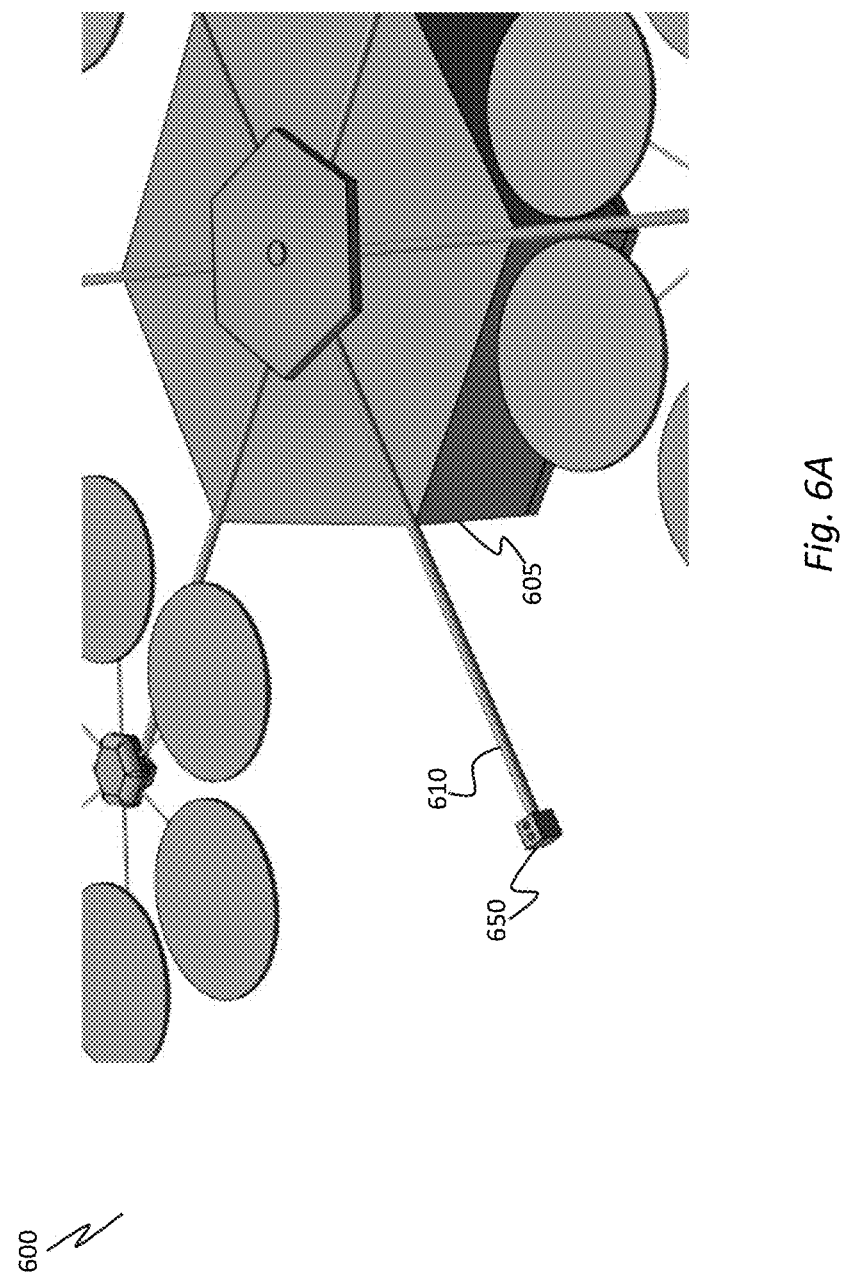

| Fractal Level | Hexcopters (N) | Frame (g) | motor (g) | esc (g) | battery 50% (g) | thrust (kg) | FC (g) | Non-Frame Wt (g) | mAh | S | V | Cargo (g) | Cargo (lb) | Cargo: Vehicle Ratio | Truss Advantage | |
|---|---|---|---|---|---|---|---|---|---|---|---|---|---|---|---|---|
| 0 | 1 | 4.40E+0 | 324 | 159 | 762 | 5.8 | 71 | 1316 | 8000 | 4 | 14.4 | 4082 | 9.0 | 2.325 | 0.54x | http://www.iscfr.us.com/fa s.gif |
| 1 | 6 | 4.04E+0 | | | | 35.0 | | 7896 | | | | 23092.8 | 50.8 | 1.935 | | |
| 2 | 36 | 6.87E+0 | | | | 210.2 | | 47376 | | | | 94125.6 | 207.1 | 0.811 | | |
| 3 | 216 | 1.17E+0 | | | | 1261.0 | | 284256 | | | | -190577 | -419.3 | -0.131 | | |
| 4 | 1296 | 1.98E+0 | | | | 7566.0 | | 1705536 | | | | -1.4E+07 | -30765.0 | -0.649 | | |
| 5 | 7776 | 3.37E+0 | | | | 45396.3 | | 10233216 | | | | -3E+08 | -664828.9 | -0.869 | | |
| 6 | 46656 | 5.74E+0 | | | | 272377.7 | | 61399296 | | | | -5.5E+09 | 12153037.5 | | | |

Bold Italic = Truss

*Fig. 12*

SYSTEMS, CABLELESS DRONE SWARM SYSTEMS, METHOD AND APPARATUS

BACKGROUND

Drones are increasingly being used to carry packages, such as for delivery to homes and businesses. Challenges for package delivery often include limitations on cargo weight due to lift capability limits of a drone. Drones typically suffer from low cargo capacity, limited flight duration and/or distance, and single point of failure which cause low reliability. However, from a cost and performance perspective, drones have a unique advantage over typical delivery methods. Drones enable fast, autonomous, point-to-point delivery at a low cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A illustrates an exploded view of an exemplary platform arm according to one embodiment of the disclosure.

FIG. 12 shows the relationship between exemplary fractal levels and cargo ratio.

DETAILED DESCRIPTION

Figure 1:
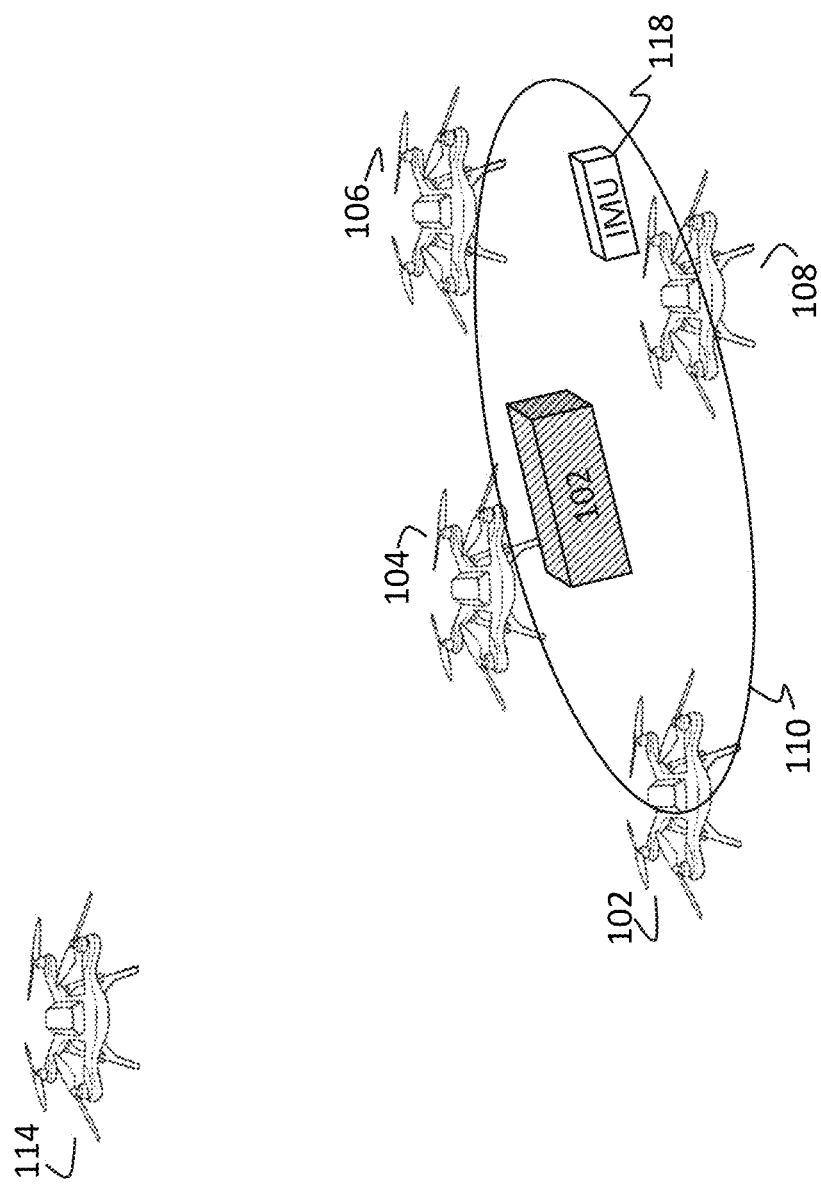
FIG. 1 illustrates a system including networked drones for conveying a support component in accordance with some embodiments.

Systems and methods for using networked drones are described herein. The systems and methods described herein may use networked drones to support and move a support component, such as a platform, net, box, etc. In certain embodiments, the networked drone system includes a drone swarm which may be releasably attached to a support platform via magnetic or mechanical means to allow transporting larger payloads with smaller drones.

An extendible or retractable fixed wing system may be optionally used to improve horizontal flight efficiency. In one embodiment, the drone attachment points rotate forward to provide forward trust. The networked drones may include a parent drone and one or more child drones. The parent drone may be controlled remotely and the child drones may move automatically in accordance with the parent drone movement. The networked drones may keep the support component stable at level or at a particular angle. The networked drones may work together to increase capacity and extend carry distance over a single drone delivery system.

The networked drone system (or a drone swarm) may be used to increase cargo carrying capacity over a single drone. Two or more drones used in the networked drone system may distribute a cargo load to increase the total system carrying capacity without increasing an individual drone load. In an example, the networked drone system may use an inertial measurement unit (IMU) mounted on, or attached to, a support component such as a cargo platform, a net, a box, etc. The IMU may be used to provide cargo orientation feedback. The feedback may be used, such as in a feedback loop (e.g., with a control system using a proportional-integral-derivative (PID) controller or the like) to control movement of one or more drones in the networked drone system to maintain stability or an orientation of the support component. The IMU may communicate with a single parent drone, which may in turn communicate with one or more child drones of the networked drone system, or the IMU may communicate with any of the drones in the networked drone system.

In an exemplary embodiment, drones in a networked drone system may include a camera, such as a camera on each drone in the networked drone system. The camera or cameras may be used to measure a distance between two drones in the networked drone system. For example, neighboring drones may use a camera to detect a distance between the drones and the drones may be controlled to maintain a predetermined distance (e.g., change the distance to the predetermined distance). In an example, the camera may be a depth camera. The camera or cameras may provide inter-drone distance feedback to maintain equal spacing between drones.

The drones in the networked drone system may have redundancy, that is, the drone swarm may continue to operate normally when one (or more than one in some example systems) drone of the networked drone system fails. Drones in the networked drone system may be replaced inflight. In one embodiment, when a drone fails or has a low batter life, the is replace in flight and without landing the networked drone system. The drones may be replaced in flight to avoid delivery disruption. Replacing drones may be used to extend range of the networked drone system. Using the networked drone system may be safer than a single heavier drone with equivalent cargo capacity, such as due to potential failure or orientation errors in the single heavier drone. The networked drone systems described herein may have a precision flight formation (e.g., within centimeter accuracy) to align magnets or mechanical connections during flight.

FIG. 1 illustrates a system 100 including networked drones (e.g., 102-108) for conveying a support component (interchangeably, platform) 110 in accordance with some embodiments. The support component 110 may be used to carry or convey cargo 112 (e.g., for delivery). The cargo 112 may secured to the support component 110 through mechanical or magnetic means. System 100 includes an IMU 118 on the support component 110 to sense orientation (e.g., pitch, roll, and yaw). IMUS 118 may communicate the orientation and provide feedback to a parent drone 102, or to child drones (e.g., 104-108). The IMU may communicate with a drone (e.g., 102-108) via wireless connection, such as Bluetooth, IEEE 802.11 (Wi-Fi), or a custom RF link. The communication may be supported by one or more antenna (not shown).

Support component 110 may move during transit (e.g., due to wind, pressure changes, object collisions, momentum, etc.) In one embodiment, the distance between the drones is maintained by fixed locations on the platform. When support component 110 is at a pitch angle relative to a horizontal, the drones (102, 104, 106 and 108) may adjust to compensate and force the support component 110 back to a horizontal pitch. For example, support component 110 is at a pitch angle in FIG. 1. Drone (e.g., child drone) 106 may move downward to decrease upward lift from the child drone 106 and the parent drone 102 may move upward to increase upward lift from the parent drone 102. These movements may force the support component 110 hack to a level pitch angle. In one example, the drones are coupled to the platform through fixed location on the platform. In another example, a rigid arm (not shown) may connect each drone to a location on the platform. The rigid arm (not shown) may have a different lengths or they may have constant length.

In certain embodiment, motion control for system 100 may be implemented by applying thrust vectors to each drone to change the roll or pith of the overall platform. Yaw thrust in the counter-clock-wise (CCW) direction can be accomplished by increasing the thrust of all clockwise (CW) rotating motors while reducing the thrust of the CCW motors. This may be analogous to the process for roll/pitch/yaw of a single drone.

In an exemplary embodiment, a drone in the system IN may be controlled in response to movement by support component 110 (e.g., changes to an angle), sensed by the IMU 118, which may send information regarding the movement or angle change to one or more of the drones (102-108). A drone may add a correction term to its drone height PID feedback loop for the roll, pitch, or yaw of the support component 110. In one implementation, the drones are controlled via either a master drone, or through redundant voting between all networked drones.

In an exemplary embodiment, any of the child drones 104-108 may assume the parent drone's role. For example, when the parent drone 102 is removed from the system 100, has a low battery, or fails, one of the child drones 104-108 may take over to control the system 100 and become a new parent drone. The new parent drone may be controlled remotely and operate as the previous parent drone did without interruption to the system 100 (e.g., while in-flight).

In an example, a spare drone 114 may be stored on a charging platform. The spare drone 114 may be inserted into the system 100 in-flight. The spare drone 114 may attach to the support component 110. Examples for attaching a spare drone to the support component 110 are described in further detail below.

In another exemplary embodiment, spare drone 114 may be added to the system 100 in response to a failure of one of the drones 102-108. When a drone fails, spare drone 114 may be added to the system 100 and the remaining functional drones may be shifted for efficient control of support component 110. If the drone that fails cannot move, it may be deadweight and additional spare drones may be added to the system to compensate for the weight. If the drone that fails still moves, it may detach or become detached from the support component 110. Once the spare drone 114 is attached to the support component 110, the failed drone may be removed from the support component 110 (e.g., the drones 102-108 and 114 may shift to allow the failed drone to detach). After the failed drone detaches, the remaining drones, including the spare drone 114 may be rearranged for efficient control of the support component 110. If the failed drone was the parent drone 102, a new parent drone may be selected, either from the child drones 104-108 or the spare drone 114.

In another exemplary embodiment, the spare drone 114 may be added to the system 100 in response to a low battery of one of the drones 102-108. When a drone has a low battery, the spare drone 114 may be sent to be added to the system 100. The low battery drone may detach from the support component 110 before the spare drone 114 is added if there is sufficient cargo carrying capacity redundancy among the remaining drones or after the spare drone 114 is added if not (or for the sake of redundancy). If the low battery drone was the parent drone 102, a new parent drone may be selected, either from the child drones 104-108 or the spare drone 114. If more than one drone has a low battery, the process may be iterated to introduce new spare drones. In another example, the spare drone 114 may be added to the system 100 as a redundancy. The drone with the low battery may land on a charging platform (e.g., the charging platform vacated by the spare drone 114).

In an example, the parent drone 102 may be controlled remotely by sending a command to the IMU, which may communicate locally with the parent drone 102. In another example. The IMU may communicate with one of the drones 102-108 at a given time as a parent drone (e.g., the IMU may select a parent drone with each communication or may select a drone as the parent drone until that drone is replaced in the system 100). In another example, the parent drone 102 may relay information to the IMU (e.g., a desired tilt angle for carrying a particular package).

Control of the parent drone 102 for guiding the system 100 to a navigation point (e.g., to pick up or deliver a package, such as the cargo 112) may use a remote control system. The remote-control system may be controlled by a user (e.g., to input coordinates or control the parent drone 102 in real time). In an example, controls for the parent drone 102 may be preset, (e.g., map or GPS coordinates may be entered, a flight plan may be preset, or the like).

Figure 2:
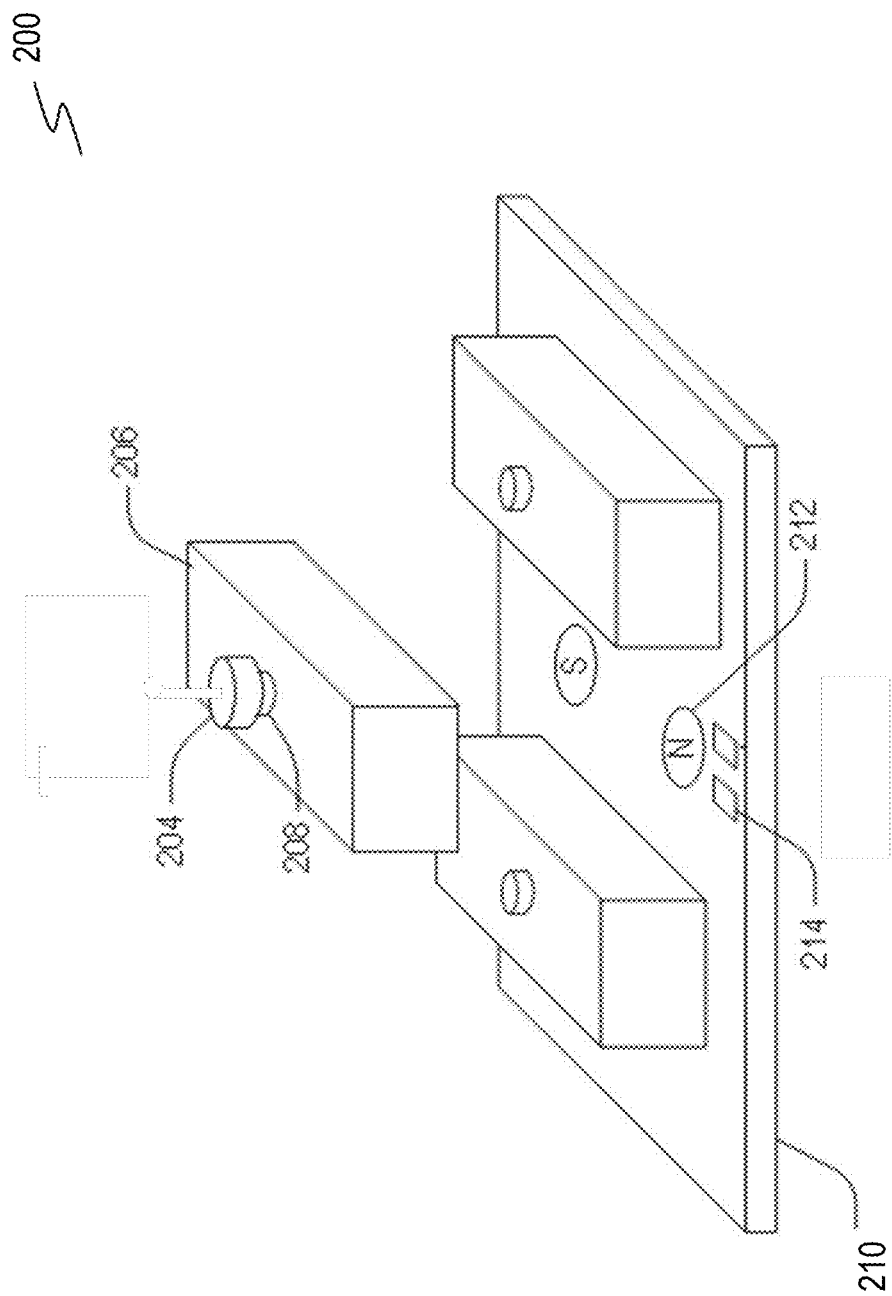
FIG. 2 illustrates a magnetic drone attachment system in accordance with some embodiments.

FIG. 2 illustrates a magnetic drone attachment system 200 in accordance with sonic embodiments. The magnetic drone attachment system 200 may use a permanent magnet (not shown) on the bottom of a platform connection component 206 to connect the platform connection component 206 with a support component 210 (e.g., a platform). The permanent magnet on the bottom of the platform connection component 206 may magnetically couple with the support component 210 using electrically reversible magnetic zones 212. The electrically reversible magnetic zones 212. may be electrically controlled to create a magnetic field to magnetically couple with the permanent magnet on the bottom of the platform connection component 206 and may be electrically controlled to reverse (or cancel) the magnetic field to repel (or release) the permanent magnet on the bottom of the platform connection component 206. The electrically reversible magnetic zones 212 or magnet 204 may be electromagnets arranged to momentarily cancel the magnetic field of one of the permanent magnets for release of the platform connection component 206 or support component 210.

Using magnets to attach the drone to the support component 210 allows quick attachment and detachment and reconfigure of drones. For example, the platform connection component 206 may be repositioned at different points or continuously around the support component 210 using the electrically reversible magnetic zones 212. The support component 210 may include power or balance connectors 214 to supply data or power to or from the drone and the support component 210. In another example, the power or balance connectors 214 may supply data from the IMU to the drone. In yet another example, the drone may communicate with the IMU using the power or balance connectors 214.

Figure 3:
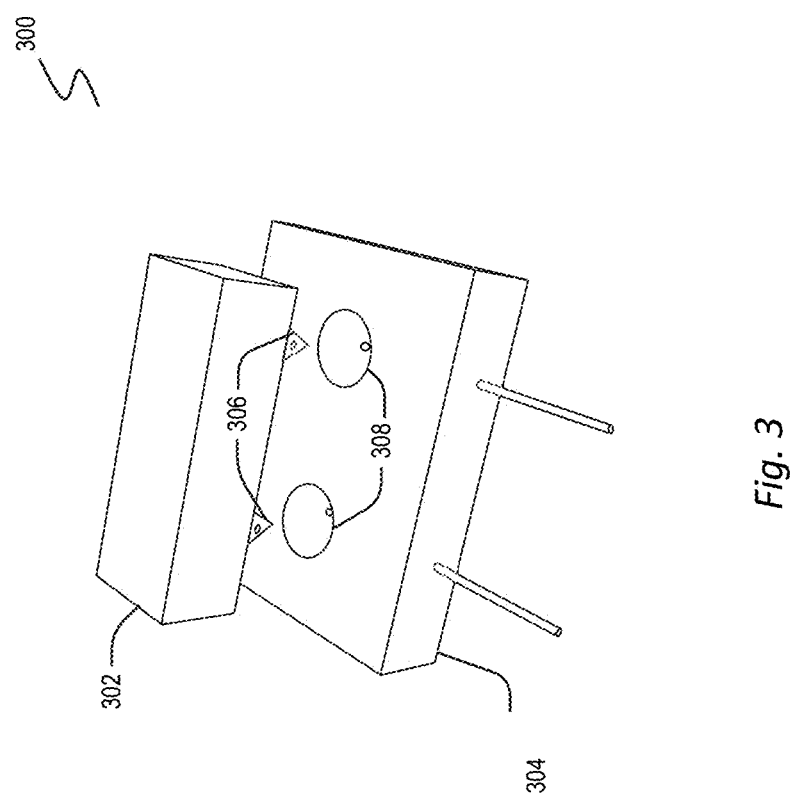
FIG. 3 illustrates a mechanical alignment drone attachment system in accordance with some embodiments.

FIG. 3 illustrates a mechanical alignment drone attachment system 300 in accordance with some embodiments. The mechanical alignment drone attachment system 300 may include one or more alignment cones 306 to attach a platform connection component 302 of a drone to a support component 304. The alignment cones 306 may be used to align the platform connection component 302 with alignment openings 308 in the support component 304. In an example, a solenoid or a pin may be used to attach the platform connection component 302 to the support component 304. A plurality of alignment openings 308 may be arranged on the support component 304 such that the platform connection component 302 may be placed at different locations on the support component 304. It should be noted that alignment cones 306 are exemplary and any other form may be used consistent with the disclosed embodiments. For example, the poles of the reversible magnet as well as the poles of the magnetic zone (not shown in FIG. 3) may have flat heads. In another exemplary embodiment, the magnetic poles may be embedded so as to have a form a substantially flat surface with the plane of a supporting substrate.

Figure 4:
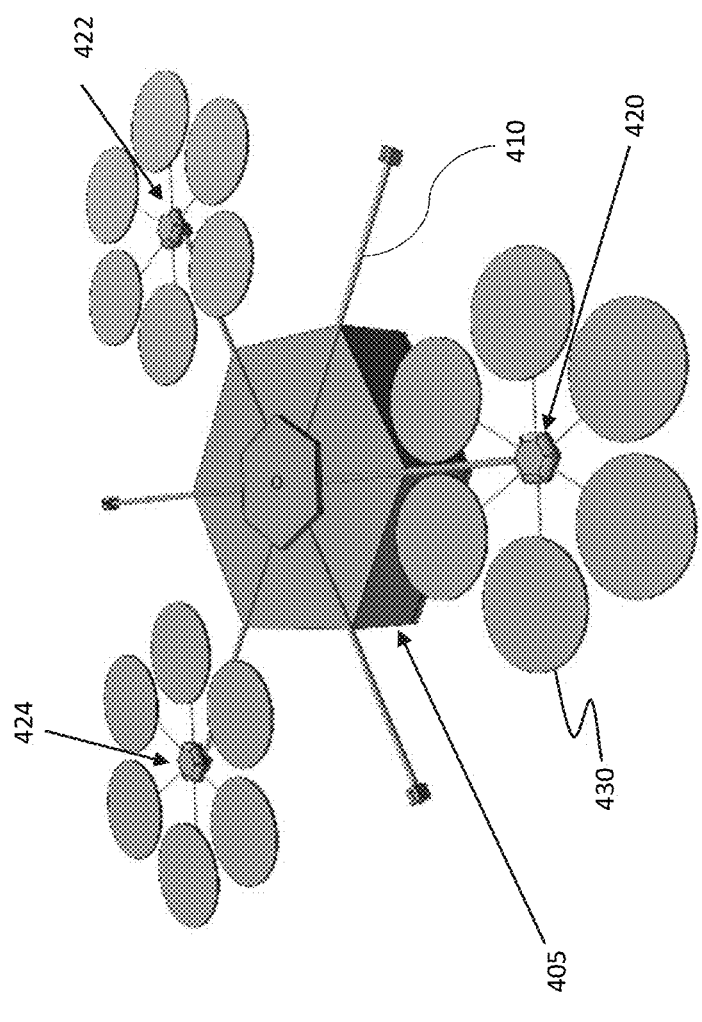
FIG. 4 illustrates a networked drone system according to one embodiment of the disclosure.

FIG. 4 illustrates a networked drone system with three active drones according to one embodiment of the disclosure. Specifically, FIG. 4 shows support networked drone system 400 having support platform 405 and drones 420, 422 and 424. Drones 420, 422 and 424 may be detachable drones or may be permanently attached to support platform 405. Support platform 405 may be configured to receive, for example, a payload. In another embodiment, support platform 405 may also receive batter or other power supply for operating drones 420, 422 and 424. In still another embodiment, support platform 405 may be configured to receive or house control circuitry or communication circuity for networked drone system 400.

Each of drones 420, 422 and 424 is configured to connect to support platform 405 through platform arm 410. Platform arm 410 may be a rigid member. In certain embodiments, all platform arms are substantially the same size and shape. In other embodiments, each platform arm may have a different size or shape. The platform arms may be integrated to support platform 405 or may be removable. As described further below, the platform arms may be configured to allow quick detachment and replacement of an associated drone. The networked drone system 400 is illustrated as having hexagonal shape with six platform arms. It should be noted that the hexagonal shape and the number of illustrated platform arms are illustrative and non-limiting. It should also be noted that while each drone is shown as having six propellers, the disclosed embodiments are not limited thereto. Each drone may have one or more propeller. Thus, the embodiment of FIG. 4 may have, for example, six drone wherein each drone has only one propeller (i.e., a helicopter drone). The hexagonal networked drone system 400 may require three drones to operate simultaneously in order to maintain flight. The unused platform arms enable including additional drone(s) while in-flight. In this manner, a new drone may be added before or while a failing drone is removed.

Figure 5:
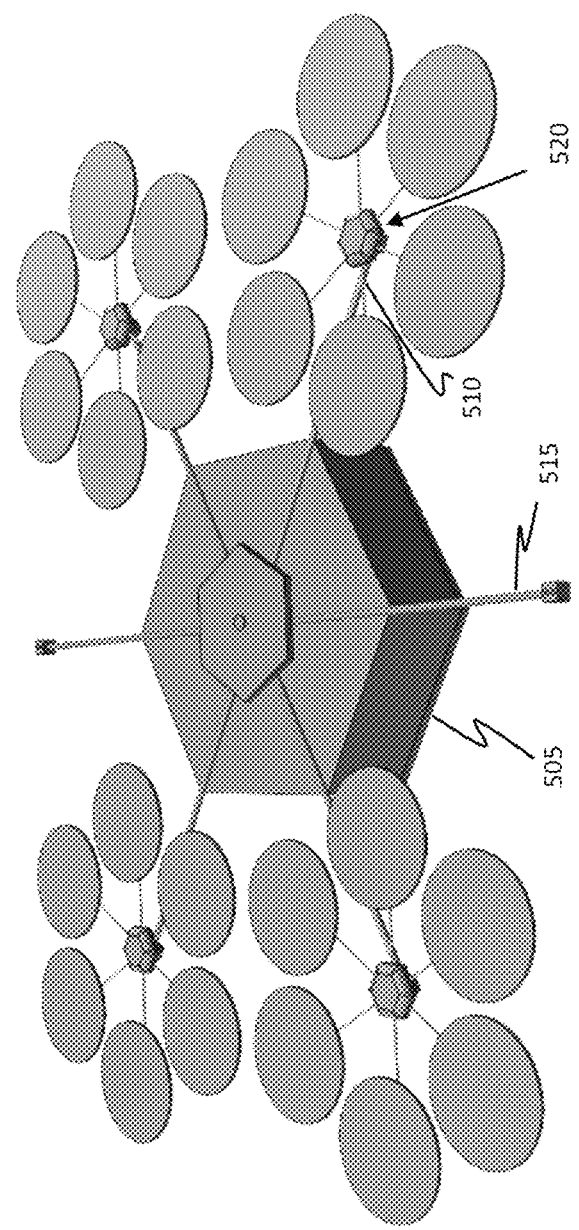
FIG. 5 illustrates a networked drone system with three active drones according to one embodiment of the disclosure.

FIG. 5 illustrates a networked drone system with four active drones according to one embodiment of the disclosure. The networked drone system 500 of FIG. 5 also includes support platform 505 as well as drones 520, 521, 522 and 523. The drones may be detachable. Each drone couples to the support platform 505 through a respective platform arm. For example, drone 520 couples to support platform 505 through platform arm 510. The configuration of FIG. 5 allows a higher lift capability than that shown in FIG. 3.

FIG. 6A illustrates an exploded view of an exemplary platform arm according to one embodiment of the disclosure. Specifically, networked drone 600 shows support platform 605 coupled to platform arm 610. Platform arm 610 may be detachable from support platform 605 or it may be integrated therewith. One or more magnets may be coupled to platform arm 610. FIG. 6A shows magnet 650 at a distal end of platform arm 610. Magnet 650 may be integrated with platform arm 610. In one embodiment, magnet 605 are electrically reversible magnets. In another embodiment, magnet 605 comprises one or more permanent magnets. Magnet 650 may be positioned to accommodate easy attachment/detachment of a drone. In certain embodiments, magnet 650 may form a plane that is perpendicular to the weight vector of platform support 605.

Figure 6B:
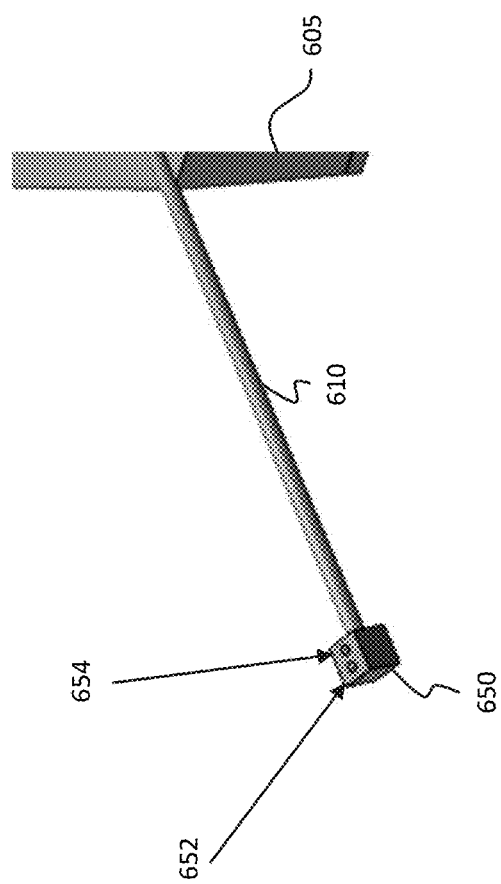
FIG. 6B is an exploded view of magnet 650 of FIG. 6A.

FIG. 6B is an exploded view of magnet 650 of FIG. 6A. Specifically, Magnet 650 is shown with magnetic poles 652 and 654, which may define the north and south poles of magnet 650. As stated, magnet 650 may be an electrically reversible magnet. Thus, poles 652 and 650 may reverse to detach to dismount a drone (not shown). Conversely, the poles may be configured to attract magnetic poles of an incoming drone (not shown) to self-alight and thereby attach the drone to platform arm 610. In FIG. 6B, magnetic poles 652 and 654 form a substantially planar surface. The plane of the magnetic poles is horizontal which is perpendicular to the weight vector of support platform 605.

In one embodiment, high strength rare-earth magnets are used in series with a magnet which can be switched with an electronic pulse. The magnet may be switched remotely. Thus, with no expended power, the magnet(s) can lift a large weight (e.g., 80 N). To release the drone, only a short electrical pulse may be used. Using adjacent alternate polarities (652, 654), an approaching drone can self-align in three dimensions to thereby reduce the attachment position control accuracy. The drone may be posited within a few centimeters of the magnets for self-alignment. Once attached, power and signals can be connected to the drone automatically through spring loaded connectors (not shown). In an exemplary embodiment where six drones are used, each magnet need to carry only one-fifth ($\frac{1}{5}$) of the total cargo capacity to allow for drone swapping. For example, if six 80 N drones are used and one is disabled, each remaining drone provides over 8 kg of lift for a total cargo capacity of 40 kg.

Figure 7B:
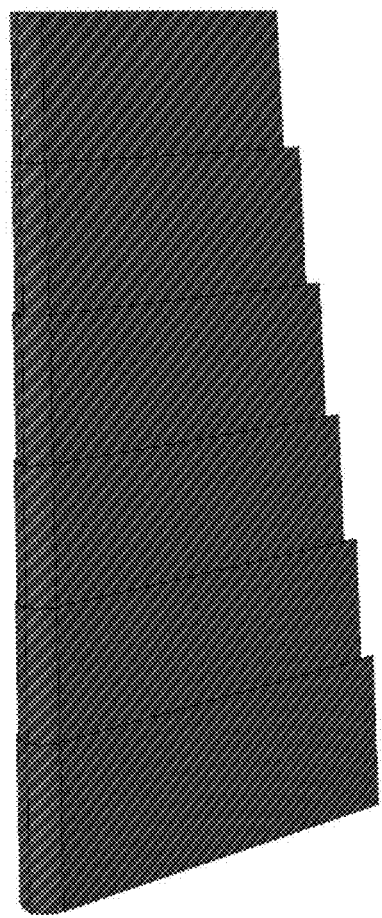
FIG. 7B shows the wing system of FIG. 7A in an expanded position.
Figure 7A:
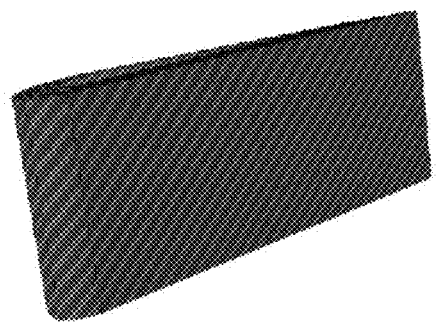
FIG. 7A shows an exemplary wing system in retracted position according to one embodiment of the disclosure.

In certain embodiments, the networked drone system may optionally include a wing system. The wing system may be retractable to accommodate vertical and horizontal flights. FIG. 7A shows an exemplary wing system in retracted position according to one embodiment of the disclosure. FIG. 7B shows the wing system of FIG. 7A in an expanded position. As seen from FIGS. 7A and 7B, segments of the wing can be configured to retract to render the wing compact. For example, each section of the wing may collapse into its neighbor similar to a collapsible antenna. The retraction and extension of the wings can be configured in the operation of the networked drone system. In an exemplary embodiment, the IMU or other control mechanism may coordinate retraction and expansion of the wings.

Figure 8:
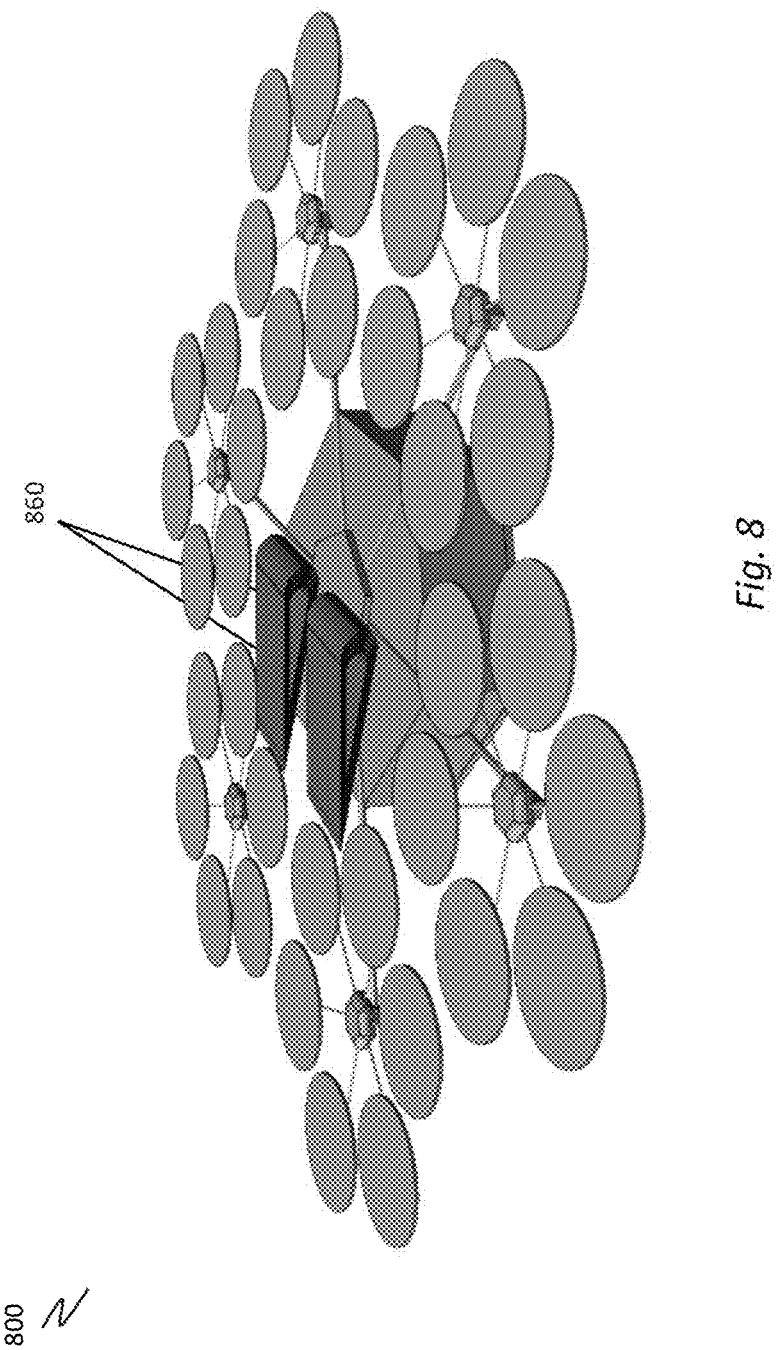
FIG. 8 shows a networked drone system with retractable wings according to one embodiment of the disclosure.

FIG. 8 shows a networked drone system with retractable wings according to one embodiment of the disclosure. The networked drone system 800 includes swarm of six drones supporting a payload through six rigid platform arms. The networked drone system 800 also includes wings 860. In the embodiment of FIG. 8, wings 860 are retracted to avoid interference with the drones' propeller rotation. In this embodiment, the drone may be engaged in vertical takeoff and landing ("VTOL").

Figure 9:
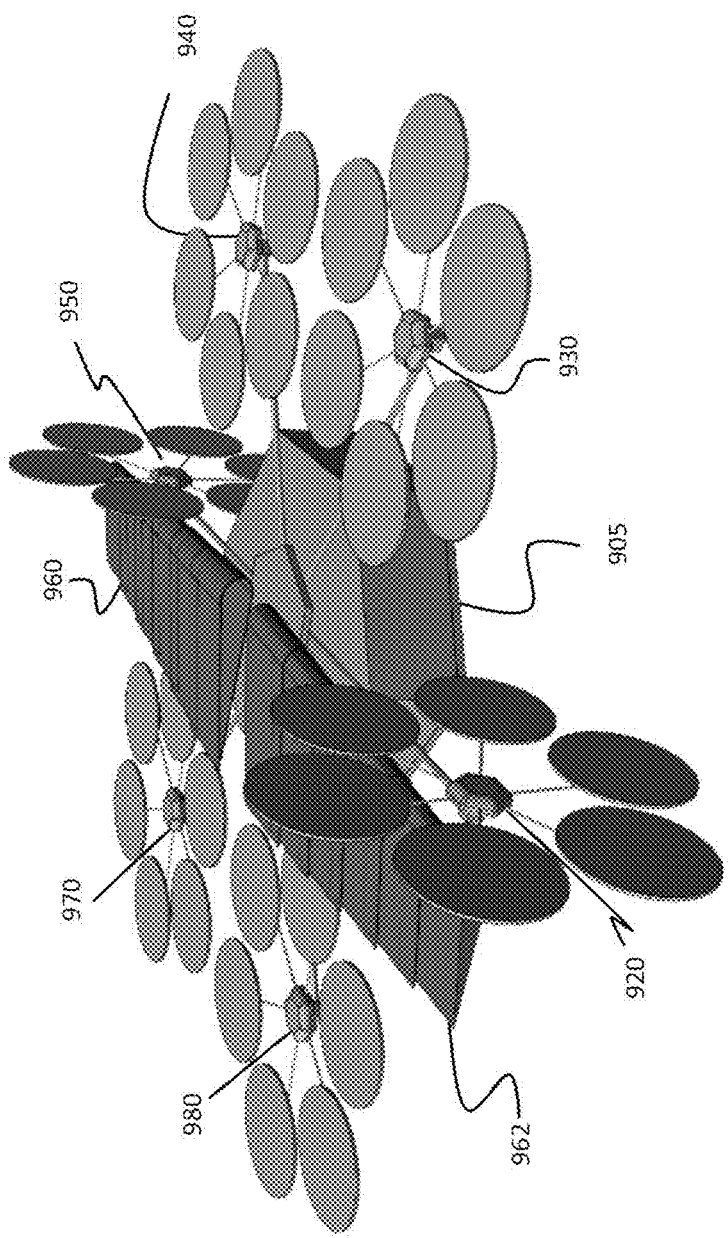
FIG. 9 shows the networked drone of FIG. 8 transitioning from VTOL to horizontal flight.

FIG. 9 shows the networked drone of FIG. 8 transitioning from VTOL to horizontal flight. In FIG. 9, platform support 905 is coupled to drones 920, 930, 940, 950, 970 and 990, through a plurality of respective platform arms. Each drone is shown with six propellers. Wings 960 and 962 are in expanded position for to provide lift for horizontal flight. Drones 920 and 950 are rotated to provide horizontal trust. The remaining four drones stabilize platform 905 of system 900 by providing roll, pitch and yaw adjustments.

The transition from VTOL-wing position shown in FIG. 8 to horizontal flight wing position of FIG. 9 may be orchestrated by a control system (not shown). The control system may be onboard support platform 905 or may be remotely located and communicate with system 900 wirelessly. In an exemplary embodiment, the control system coordinates rotation of drones 920 and 950 to avoid interference with expanding wings 960 and 962. The coordination may also include other flight operations, such as, lift-off, transport and delivery of the payload (not shown). The control system may further coordinate roll, pitch and yaw adjustments for the networked drone system 900. In this manner, drones 930, 940, 970 and 990 may act as rudder and stabilizers for the networked drone system. The control system may include one or more processors programmed with instructions to implement these and other steps.

Figure 10:
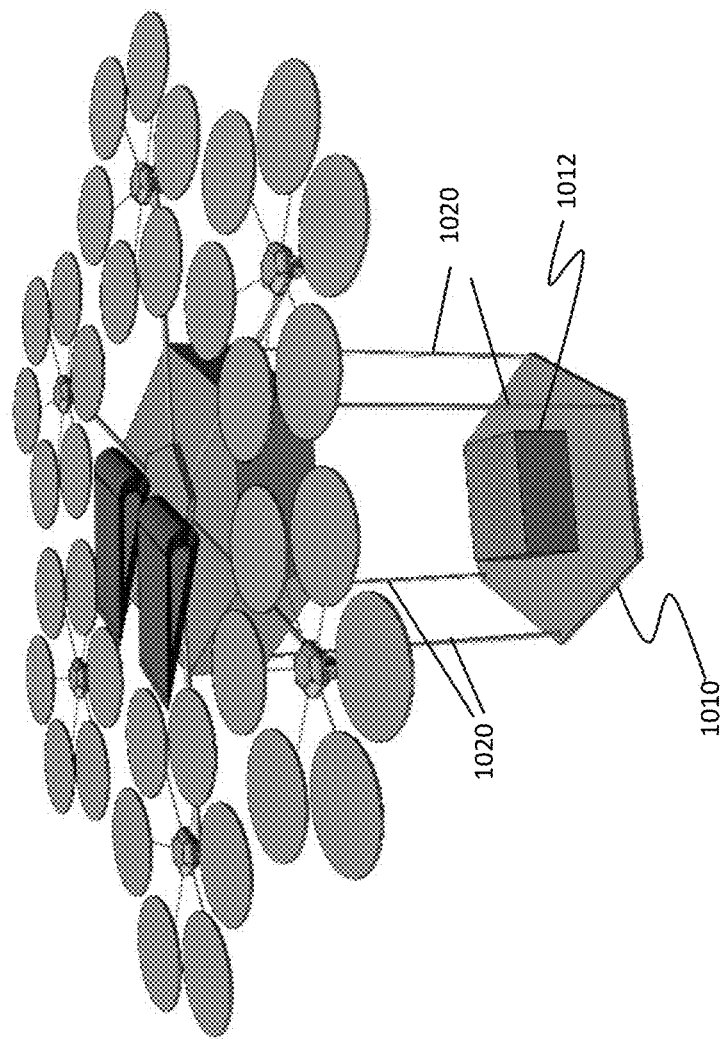
FIG. 10 illustrates a networked drone system with an extended support platform according to one embodiment of the disclosure.

FIG. 10 illustrates a networked drone system with an extended support platform according to one embodiment of the disclosure. Specifically, support platform 1010 of networked drone system 1000 is extended downward to discard payload 1012. In this exemplary embodiment, the payload is delivered by extending the floor of support platform 1010 to the ground. This keeps the drone at a safe distance from ground personnel and precludes the drone swarm from landing. Cables 1020 may be individually adjusted to tilt the platform sufficiently to allow unloading the payload. Electrically reversible magnets (not shown) and a metal plate on the cargo can provide stability during flight and delivery such that the payload does not slide until desired. A control system (not shown) may be used for controlling cables 1020 and for tilt-delivery of payload 1012.

Figure 11:
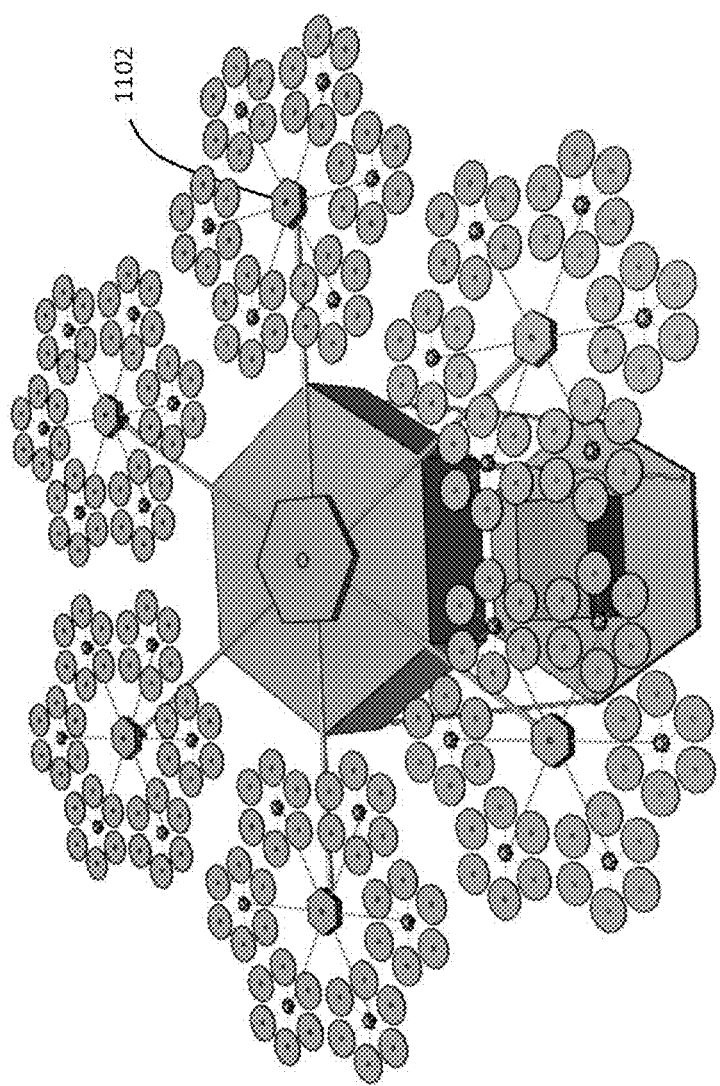
FIG. 11 illustrates an exemplary scaling of the networked drone system of FIG. 10.

FIG. 11 illustrates an exemplary scaling of the exemplary networked drone system of FIG. 10. Each drone of FIG. 10 was shown with six propellers, for a total of 36 propellers. The system of FIG. 10 is fractally scaled up in FIG. 11 by replacing each propeller of FIG. 10 with a small drone. Node 102, for example, is shown with six drones, each having six propellers. It should note noted that the fractally expanded embodiment of FIG. 11 has 36 platform attachment arms. In this configuration, a six-drone unit can be replaced at once or any one of the 36 individual units may be replaced from any drone. Thus, each attach point may be replaced individually without affecting the remaining drones in the swarm. Fractal scaling may be limited. Structural component weights may scale at $N^3$ while trust may scale at $N^2$ (where N is the number of drones). FIG. 12 shows the relationship between exemplary fractal levels and cargo ratio.

Figure 13:
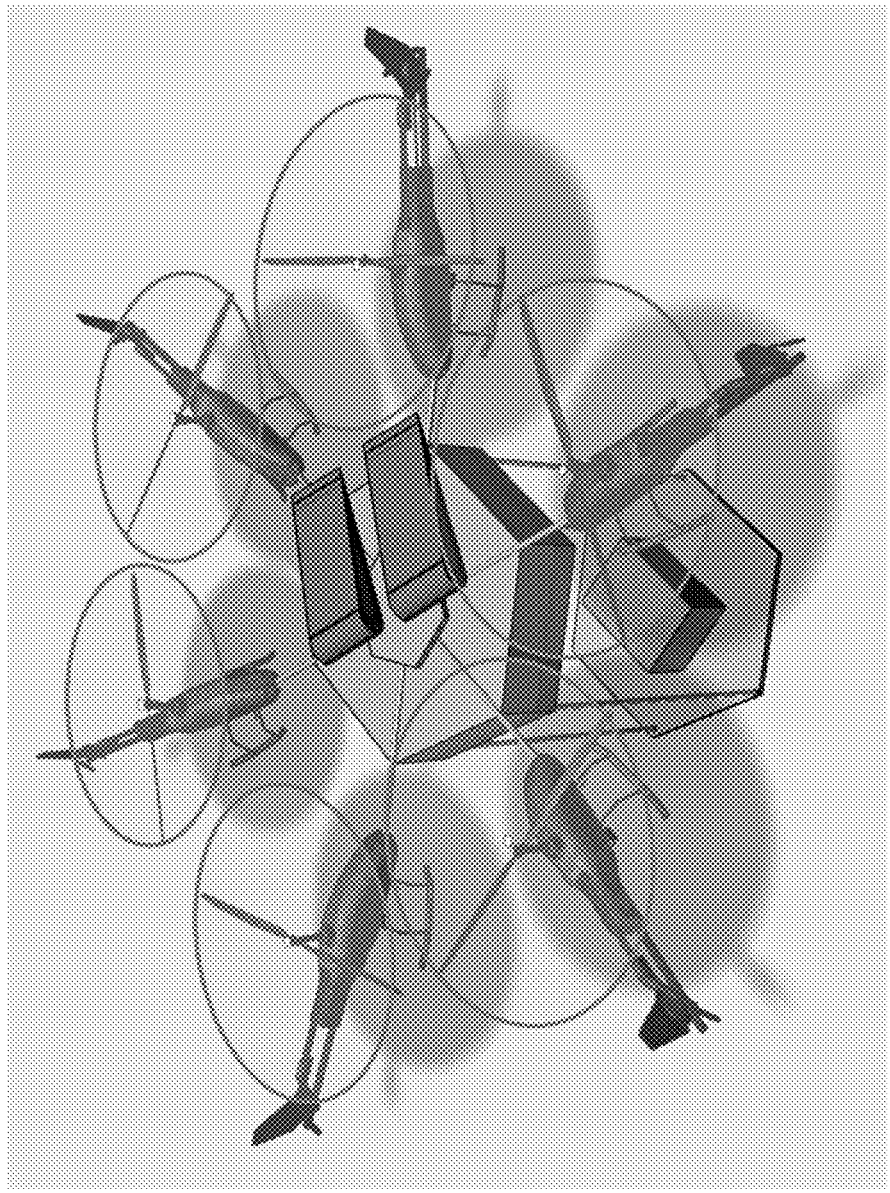
FIG. 13 shows an exemplary embodiment having six single-propeller drones supporting a payload.

FIG. 13 shows an exemplary embodiment having six single-propeller drones supporting a payload. As stated, a networked drone system according to the disclosed principles is not limited to multi-propeller drones. The drones may be quads, tri-copters or even autonomous rotary wing vehicles (e.g., helicopters). The advantage of a single rotor craft is the efficiency of the propeller increases with size. A drawback is safety. The single larger rotor is more dangerous than multiple smaller propellers with equivalent thrust. The single rotors may be collective pitch propellers and thrust to each helicopter may be controlled by modifying the blade pitch (not rotational speed). Reversible motors may allow the helicopters to turn off their tail rotors while attached (to increase efficiency), and still obtain neutral yaw. As with the previously disclosed embodiments, a flight controller is may control the thrust of each helicopter as if it were a brushless motor in a hexacopter.

Figure 14:
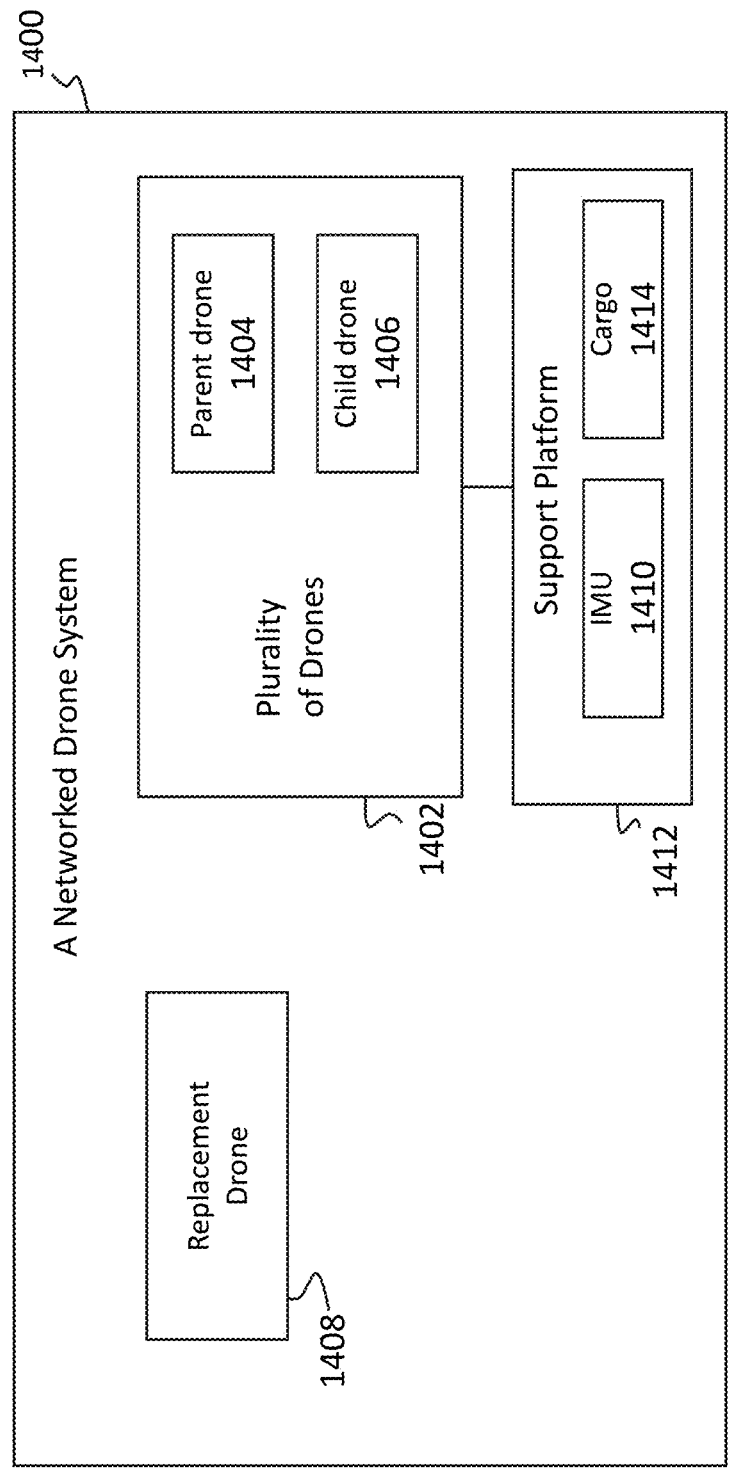
FIG. 14 illustrates a networked drone system according to one embodiment of the disclosure.

FIG. 14 illustrates a networked drone system 1400 in accordance with some embodiments. The networked drone system 1400 includes a plurality of drones 1402 including a parent drone 1404 and at least one child drone 1406. The networked drone system 1400 may include a replacement drone 1408. The plurality of drones 1402 support and move a support platform 1410, which includes an IMU 1412 and may support cargo 1414, such as a package for remote delivery.

In an example, the IMU 1412 may capture support platform balance information related to the support platform 1410. The IMU 1412 may transmit the support platform balance information, for example to the parent drone 1404, the child drone 1406, any other drone in the plurality of drones 1402, the replacement drone 1408, or a combination of drones. The parent drone 1404 may be controllable by a remote control device. The remote control device may be used to send a movement command to the parent drone 1404, causing the parent drone 1404 to move while maintaining support of the support platform 1410.

The replacement drone 1408 may join the plurality of drones 1402, such as during flight, and the replacement drone 1408 may then be used to support and move the support platform 1410. In an example, the replacement drone 1408 may join the plurality of drones 1402 when the parent drone 1404 or one of the at least one child drone 1406 has a low battery. In another example, the replacement drone 1408 may join the plurality of drones 1402 for redundancy. One of the at least one child drones 1406 may leave the plurality of drones 1402 in response to the replacement drone 1408 joining the plurality of drones 1402.

In an example, drones in the plurality of drones 1402 may reconfigure their orientation with respect to each other or the support platform 1410, for example, in response to the replacement drone 1408 being indicated as joining the plurality of drones 1402, in response to one of the plurality of drones 1402 being indicated as leaving the plurality of drones 1402, or in response to a failure or dead battery of a drone of the plurality of drones 1402. When the parent drone 1404 leaves, the plurality of drones 1402, one of the at least one child drones 1406 may take over as the parent drone 1404. When a replacement drone 1408 is added to the plurality of drones 1402 and the parent drone 1404 leaves, the replacement drone 1408 or one of the at least one child drones 1406 may take over as a parent drone. The new parent drone may be controllable by the remote control device.

In an exemplary embodiment, the IMU 1412 may transmit the support platform balance information to all drones in the plurality of drones 1402. In another example, the IMU 1412 may transmit the support platform balance information to only the parent drone 1404, the parent drone 1404 to communicate the support platform balance information to remaining drones in the plurality of drones 1402 (e.g., the at least one child drone 1406). In an example, the IMU 1412 may transmit the support platform balance information wirelessly to the parent drone 1402 or the at least one child drone 1406. In another example, the IMU 1412 may transmit the support platform balance information along a connection portal (proximate to the magnet coupling) to the parent drone 1404. The support platform balance information may include a yaw, a pitch, or a roll of the support platform 1410. The plurality of drones 1402 may compensate for changes in the yaw, the pitch, or the roll of the support platform 1410 using a control system, the control system to separately control each drone in the plurality of drones 1402. The control system may include a local control system for each drone in the plurality of drones 1402.

In an example, the at least one child drone 1406 includes at least two child drones, the at least two child drones and the parent drone 1404 configured to dynamically support the support platform 1410. In an example, the at least one child drone 1406 is to maintain a specified distance from the parent drone. The at least one child drone 1406 may maintain a specified distance from another child drone.

The parent drone 1404 may receive an indication of a low battery in a drone in the networked drone system 1400, the indication including an identification of the replacement drone 1408 to replace the drone with the low battery in the networked drone system 1400. The parent drone 1404 may send a reconfiguration command to the at least one child drone 1406 to incorporate the replacement drone 1408 in the networked drone system 1400. The reconfiguration command may include a first operation to configure drones the networked drone system 1400 in a first arrangement including the drone with the low battery and the replacement drone 1408 and a second operation to configure drones in the networked drone system 1400 in a second arrangement including the replacement drone 1408 without the drone with the low battery, after the drone with the low battery is removed from the networked drone system 1400. The drone with the low battery may be configured to return to a recharging station after being removed from the networked drone system 1400.

Figure 15:
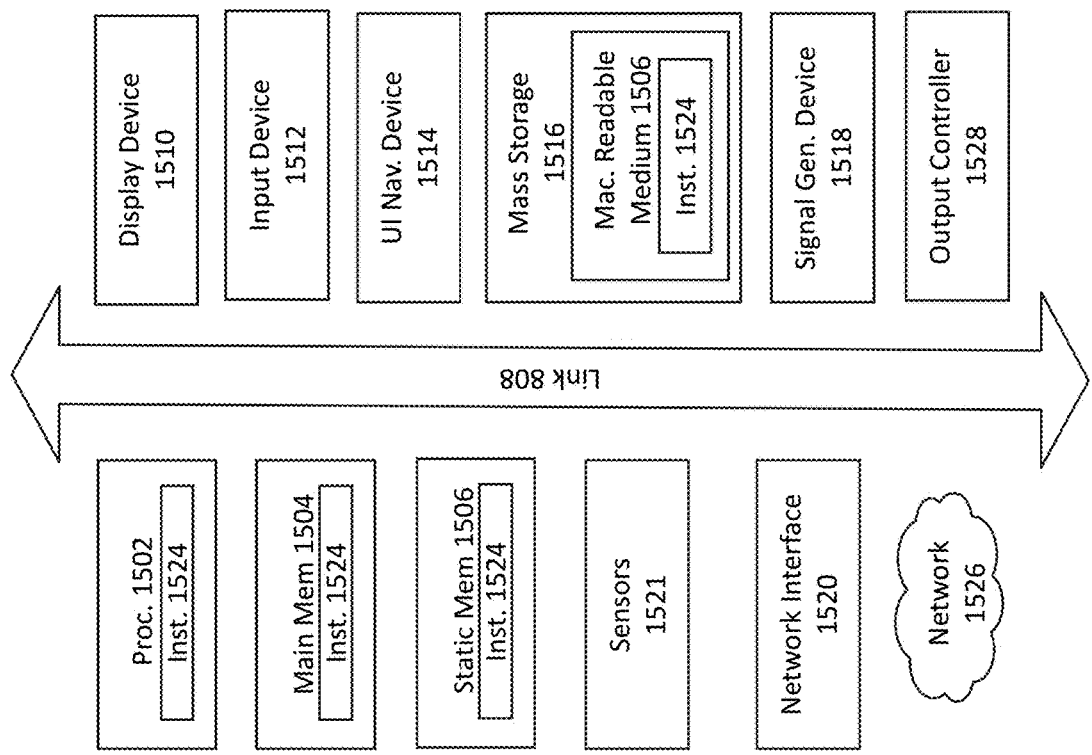
FIG. 15 illustrates generally an example of a block diagram of a machine upon which any one or more of the techniques (e.g., methodologies) discussed herein may perform in accordance with some embodiments.

FIG. 15 illustrates generally an example of a block diagram of a machine upon which any one or more of the techniques (e.g., methodologies) discussed herein may perform in accordance with some embodiments. In FIG. 15 the machine 1500 may operate as a standalone device or may be connected (e.g., networked) to other machines. In a networked deployment, the machine 1500 may operate in the capacity of a server machine, a client machine, or both in server-client network environments. In an example, machine 1500 may act as a peer machine in peer-to-peer (P2P) (or other distributed) network environment. The machine 1500 may be a personal computer (PC), a tablet PC, a drone computing device, a control system, an IMU, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510, an alphanumeric input device 1512 (e.g., a keyboard), and a user interface (UI) navigation device 1514 (e.g., a mouse). In an example, the display unit 1510, alphanumeric input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensors. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine readable medium 1522 that is non-transitory on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine readable medium 1522 is illustrated as a single medium, the term "machine readable medium" may include a single medium or multiple media (e.g., a centralized or distributed database, or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 1502.11 family of standards known as Wi-Fi®, IEE 802.16 family of standards known as WiMax®), IEEE 1502.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software.

Additional Notes & Examples

Example 1 is directed to a networked drone system, comprising: a support platform to receive a payload; a plurality of drones to support and move the support platform; and an electrically reversible magnet configured to connect the support platform to one or more of the plurality of drones; wherein the electrically reversible magnet includes at least a pair of opposite polarity magnets in a substantially planar alignment.

Example 2 is directed to the networked drone system of example 1, wherein the electrically reversible magnet comprises magnetic poles positioned substantially perpendicular to a weight vector of the support platform.

Example 3 is directed to the networked drone system of any preceding example, further comprising a rigid platform arm extending between the support platform and at least one of the plurality of drones to thereby connect the support platform to the at least one drone, the rigid platform arm supporting the electrically reversible magnet.

Example 4 is directed to the networked drone system of any preceding example, wherein an unencumbered rigid platform arm is configured for magnetic self-alignment with an approaching drone.

Example 5 is directed to the networked drone system of any preceding example, wherein the support platform further comprises an inertial measurement unit (IMU) to capture and transmit support platform balance information.

Example 6 is directed to the networked drone system of any preceding example, wherein the plurality of drones comprises a parent drone and at least one child drone and wherein the parent drone is configured to receive balance information from the IMU.

Example 7 is directed to the networked drone system of any preceding example, further comprising collapsible airfoils.

Example 8 is directed to the networked drone system of any preceding example, wherein the collapsible airfoils extend and retract responsive to the networked drone's movement direction.

Example 9 is directed to the networked drone system of example 1, wherein the plurality of drones is fractally expandable at a plurality of nodes of the networked drone system.

Example 10 is directed to the networked drone system of any preceding example, wherein the rigid platform arm is configured for in-flight drone replacement through the rigid platform arm and the electrically reversible magnet.

Example 11 is directed to a method for in-flight replacement of a first drone from a networked drone system coupled to a support platform, the method comprising: receiving, from the networked drone system, an initial command for in-flight replacement of a first drone of the networked drone system; releasing the first drone from the networked drone system by reversing poles of an electrically reversible magnet attaching the first drone to the networked drone system; attaching a replacement drone in place of the released first drone to assist supporting the networked drone system; and integrating flight operation of the replacement drone with the networked drone system.

Example 12 is directed to the method of preceding example 11, wherein the electrically reversible magnet comprises at least two poles attached to a rigid platform arm, the rigid platform arm connecting the networked drone system to the first drone.

Example 13 is directed to the method of any of examples 11-12, wherein the electrically reversible magnet is integrated with the rigid platform arm.

Example 14 is directed to the method of any of examples 11-13, wherein the two poles of the electrically reversible magnets define an attachment plane substantially perpendicular to a weight vector of the networked drone system.

Example 15 is directed to the method of any of examples 11-14, wherein attaching the replacement drone further comprises placing attachment point of the replacement drone proximal to the poles of the electrically reversible magnets of the rigid attachment arm.

Example 16 is directed to the method of any of examples 11-15, wherein the attachment point of the first drone self-aligns to the electrically reversible magnets.

Example 17 is directed to the method of any of examples 11-16, further comprising extending and retracting a pair of collapsible airfoils associated with the networked drone responsive to the networked drone's flight operation.

Example 18 is directed at least one machine-readable medium including instructions for inflight replacement of a first drone in a networked drone system, which when executed by the networked drone system, causes the drone to: receive, from the networked drone system, an initial command for in-flight replacement of a first drone of the networked drone system; release the first drone from the networked drone system by reversing poles of an electrically reversible magnet attaching the first drone to the networked drone system; attach a replacement drone in place of the released first drone to assist supporting the networked drone system; and integrating flight operation of the replacement drone with the networked drone system.

Example 19 is directed to the machine-readable medium of example 18, wherein the networked drone system further comprises on or more processors configured to execute the instructions for in-flight replacement of the first drone.

Example 20 is directed to the machine-readable medium of examples 18-19, wherein the electrically reversible magnet comprises at least two poles attached to a rigid platform arm, the rigid platform arm connecting the networked drone system to the first drone.

Example 21 is directed to the machine-readable medium of examples 18-20, wherein the electrically reversible magnet is integrated with the rigid platform arm.

Example 22 is directed to the machine-readable medium of examples 18-21, wherein the two poles of the electrically reversible magnets define an attachment plane substantially perpendicular to a weight vector of the networked drone system.

Example 23 is directed to the machine-readable medium of examples 18-22, wherein attaching the replacement drone further comprises placing attachment point of the replacement drone proximal to the poles of the electrically reversible magnets of the rigid attachment arm.

Example 24 is directed to the machine-readable medium of examples 18-23, wherein the attachment point of the first drone self-aligns to the electrically reversible magnets.

Example 25 is directed to the machine-readable medium of examples 18-24, further comprising extending and retracting a pair of collapsible airfoils associated with the networked drone responsive to the networked drone's flight operation.

The following non-limiting examples are presented to illustrate different embodiments of the disclosure. Example 1 relates to a networked drone system, comprising: a support platform to receive a payload; a plurality of drones to support and move the support platform; and an electrically reversible magnet configured to connect the support platform to one or more of the plurality of drones; wherein the electrically reversible magnet includes at least a pair of opposite polarity magnets in a substantially planar alignment.

Example 2 is directed to the networked drone system of claim 1, wherein the electrically reversible magnet comprises magnetic poles positioned substantially perpendicular to a weight vector of the support platform.

Example 3 is directed to the networked drone system according to any of claims 1-2, further comprising a rigid platform arm extending between the support platform and at least one of the plurality of drones to thereby connect the support platform to the at least one drone, the rigid platform arm supporting the electrically reversible magnet.

Example 4 is directed to the networked drone system according to any of claims 1-3, wherein an unencumbered rigid platform arm is configured for magnetic self-alignment with an approaching drone.

Example 5 is directed to the networked drone system according to any of claims 1-4, wherein the support platform further comprises an inertial measurement unit (IMU) to capture and transmit support platform balance information.

Example 6 is directed to the networked drone system according to any of claims 1-5, wherein the plurality of drones comprises a parent drone and at least one child drone and wherein the parent drone is configured to receive balance information from the IMU.

Example 7 is directed to the networked drone system according to any of claims 1-6, further comprising collapsible airfoils.

Example 8 is directed to the networked drone system according to any of claims 1-7, wherein the collapsible airfoils extend and retract responsive to the networked drone's movement direction.

Example 9 is directed to the networked drone system of claim 1, wherein the plurality of drones is fractally expandable at a plurality of nodes of the networked drone system.

Example 10 is directed to the networked drone system according to any of claims 1-9, wherein the rigid platform arm is configured for in-flight drone replacement through the rigid platform arm and the electrically reversible magnet.

Example 11 is directed to at least one machine-readable medium including instructions for inflight replacement of a first drone in a networked drone system, which when executed by the networked drone system, causes the drone to: receive, from the networked drone system, an initial command for in-flight replacement of a first drone of the networked drone system; release the first drone from the networked drone system by reversing poles of an electrically reversible magnet attaching the first drone to the networked drone system; attach a replacement drone in place of the released first drone to assist supporting the networked drone system; and integrating flight operation of the replacement drone with the networked drone system.

Example 12 is directed to the machine-readable medium of claim 11, wherein the networked drone system further comprises on or more processors configured to execute the instructions for in-flight replacement of the first drone.

Example 13 is directed to the machine-readable medium according to any of claims 1-12, wherein the electrically reversible magnet comprises at least two poles attached to a rigid platform arm, the rigid platform arm connecting the networked drone system to the first drone.

Example 14 is directed to the machine-readable medium according to any of claims 1-13, wherein the electrically reversible magnet is integrated with the rigid platform arm.

Example 15 is directed to the machine-readable medium according to any of claims 1-14, wherein the two poles of the electrically reversible magnets define an attachment plane substantially perpendicular to a weight vector of the networked drone system.

Example 16 is directed to the machine-readable medium according to any of claims 1-15, wherein attaching the replacement drone further comprises placing attachment point of the replacement drone proximal to the poles of the electrically reversible magnets of the rigid attachment arm.

Example 17 is directed to the machine-readable medium according to any of claims 1-16, wherein the attachment point of the first drone self-aligns to the electrically reversible magnets.

Example 18 is directed to the machine-readable medium according to any of claims 1-17, further comprising extending and retracting a pair of collapsible airfoils associated with the networked drone responsive to the networked drone's flight operation.

Example 19 is directed to a method for in-flight replacement of a first drone from a networked drone system coupled to a support platform, the method comprising: receiving, from the networked drone system, an initial command for in-flight replacement of a first drone of the networked drone system; releasing the first drone from the networked drone system by reversing poles of an electrically reversible magnet attaching the first drone to the networked drone system; attaching a replacement drone in place of the released first drone to assist supporting the networked drone system; and integrating flight operation of the replacement drone with the networked drone system.

Example 20 is directed to the method of claim 19, wherein the electrically reversible magnet comprises at least two poles attached to a rigid platform arm, the rigid platform arm connecting the networked drone system to the first drone.

Example 21 is directed to the method according to any of claims 19-20, wherein the electrically reversible magnet is integrated with the rigid platform arm.

Example 22 is directed to the method according to any of claims 19-21, wherein the two poles of the electrically reversible magnets define an attachment plane substantially perpendicular to a weight vector of the networked drone system.

Example 23 is directed to the method according to any of claims 19-22, wherein attaching the replacement drone further comprises placing attachment point of the replacement drone proximal to the poles of the electrically reversible magnets of the rigid attachment arm.

Example 24 is directed to the method according to any of claims 19-23, wherein the attachment point of the first drone self-aligns to the electrically reversible magnets.

Example 25 is directed to the method according to any of claims 19-24, further comprising extending and retracting a pair of collapsible airfoils associated with the networked drone responsive to the networked drone's flight operation.

Example 26 is directed to a machine readable-storage including machine-readable instructions, when executed, to implement a method or realize an apparatus as claimed in any of claims 1-18.

Example 27 is directed to a system for in-flight replacement of a first drone from a networked drone system coupled to a support platform, the method comprising: means for receiving, from the networked drone system, an initial command for in-flight replacement of a first drone of the networked drone system; means for releasing the first drone from the networked drone system by reversing poles of an electrically reversible magnet attaching the first drone to the networked drone system; means for attaching a replacement drone in place of the released first drone to assist supporting the networked drone system; and means for integrating flight operation of the replacement drone with the networked drone system.

Example 28 is directed to the method of claim 27, wherein the electrically reversible magnet comprises at least two poles attached to a rigid platform arm, the rigid platform arm connecting the networked drone system to the first drone.

Example 29 is directed to the system according to any of claims 27-28, wherein the electrically reversible magnet is integrated with the rigid platform arm.

Example 30 is directed to the system according to any of claims 27-29, wherein the two poles of the electrically reversible magnets define an attachment plane substantially perpendicular to a weight vector of the networked drone system.

Example 31 is directed to the system according to any of claims 27-30, wherein the means for attaching the replacement drone further comprises means for placing attachment point of the replacement drone proximal to the poles of the electrically reversible magnets of the rigid attachment arm.

Example 32 is directed to the system according to any of claims 27-31 wherein the attachment point of the first drone self-aligns to the electrically reversible magnets.

Example 33 is directed to the system according to any of claims 27-32, further comprising means for extending and retracting a pair of collapsible airfoils associated with the networked drone responsive to the networked drone's flight operation.

Example 34 is directed to a non-transient, machine-readable storage including machine-readable instructions, when executed, configured to implement a method or realize an apparatus according to any of claims 28-33.

In the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

While the principles of the disclosure have been illustrated in relation to the exemplary embodiments shown herein, the principles of the disclosure are not limited thereto and include any modification, variation or permutation thereof.

What is claimed is:

1. A networked drone system, comprising:
a support platform configured to receive a payload;
a plurality of drones to support and move the support platform; and
an electrically reversible magnet to connect the support platform to one or more drone in the plurality of drones;
wherein the electrically reversible magnet includes at least a pair of opposite polarity magnets in a substantially planar alignment;
wherein the support platform further comprises an inertial measurement unit (IMU) configured to capture and transmit support platform balance information.

2. The networked drone system of claim 1, wherein the electrically reversible magnet comprises magnetic poles positioned substantially perpendicular to a weight vector of the support platform.

3. The networked drone system of claim 1, further comprising a rigid platform arm extending between the support platform and at least one drone in the plurality of drones to thereby connect the support platform to the at least one drone in the rigid platform arm supports the electrically reversible magnet.

4. The networked drone system of claim 1, wherein an unencumbered rigid platform arm is configured for magnetic self-alignment with an approaching drone.

5. The networked drone system of claim 1, wherein the plurality of drones comprises a parent drone and at least one child drone and, wherein the parent drone is configured to receive balance information from the IMU.

6. The networked drone system of claim 1, further comprising collapsible wings.

7. The networked drone system of claim 6, wherein the collapsible wings extend and retract responsive to a movement direction of the network drone system.

8. The networked drone system of claim 1, wherein the plurality of drones is fractally expandable at a plurality of nodes of the networked drone system.

9. The networked drone system of claim 3, wherein the rigid platform arm is configured for in-flight drone replacement through the rigid platform arm and the electrically reversible magnet.

10. At least one, non-transient, machine-readable medium in communication with a processor, the machine-readable medium including instructions for inflight replacement of a first drone in a networked drone system having a plurality of drones connected to a support platform to receive a payload, which when executed by the networked drone system, causes the drone to implement steps comprising:
receiving, from the networked drone system, an initial command for in-flight replacement of a first drone of the networked drone system;
releasing the first drone in the networked drone system from the networked drone system by reversing poles of an electrically reversible magnet having two poles which connect the first drone to the networked drone system;
attaching a replacement drone in place of the released first drone to assist supporting the networked drone system; and
integrating flight operation of the replacement drone with the networked drone system;
wherein the support platform further comprises an inertial measurement unit (IMU) configured to capture and transmit support platform balance information.

11. The machine-readable medium of claim 10, wherein the networked drone system further comprises one or more processors configured to execute the instructions for in-flight replacement of the first drone.

12. The machine-readable medium of claim 10, wherein the electrically reversible magnet comprises at least two poles attached to a rigid platform arm, the rigid platform arm connecting the networked drone system to the first drone.

13. The machine-readable medium of claim 12, wherein the electrically reversible magnet is integrated with the rigid platform arm.

14. The machine-readable medium of claim 10, wherein the two poles of the electrically reversible magnet define an attachment plane substantially perpendicular to a weight vector of the networked drone system.

15. The machine-readable medium of claim 12, wherein attaching the replacement drone further comprises placing an attachment point of the replacement drone proximal to the poles of the electrically reversible magnet of the rigid platform arm.

16. The machine-readable medium of claim 15, wherein the attachment point of the first drone self-aligns to the electrically reversible magnet.

17. The machine-readable medium of claim 10, further comprising extending and retracting a pair of collapsible wings associated with the networked drone in response to the flight operation of the networked drone systems.

18. A method for in-flight replacement of a first drone from a networked drone system coupled to a support platform, the method comprising:
receiving, from the networked drone system, an initial command for in-flight replacement of the first drone of the networked drone system;
releasing the first drone in the networked drone system from the networked drone system by reversing poles of an electrically reversible magnet having two poles which couple the first drone to the networked drone system;
attaching a replacement drone in place of the released first drone to assist supporting the networked drone system; and
integrating flight operation of the replacement drone with the networked drone system;
wherein the support platform further comprises an inertial measurement unit (IMU) configured to capture and transmit support platform balance information.

19. The method of claim 18, wherein the electrically reversible magnet comprises at least two poles attached to a rigid platform arm, the rigid platform arm connecting the networked drone system to the first drone.

20. The method of claim 19, wherein the electrically reversible magnet is integrated with the rigid platform arm.

21. The method of claim 18, wherein the two poles of the electrically reversible magnet define an attachment plane substantially perpendicular to a weight vector of the networked drone system.

22. The method of claim 19, wherein attaching the replacement drone further comprises placing an attachment point of the replacement drone proximal to the poles of the electrically reversible magnet of the rigid platform arm.

23. The method of claim 18, wherein the attachment point of the first drone self-aligns to the electrically reversible magnet.

24. The method of claim 18, further comprising extending and retracting a pair of collapsible wings associated with the networked drone responsive to the networked drone's flight operation.

* * * * *